(12) United States Patent
Deng et al.

(10) Patent No.: US 12,271,989 B2
(45) Date of Patent: Apr. 8, 2025

(54) METHOD AND APPARATUS FOR ADDING ANIMATION TO VIDEO, AND DEVICE AND MEDIUM

(71) Applicant: BEIJING ZITIAO NETWORK TECHNOLOGY CO., LTD., Beijing (CN)

(72) Inventors: Zhiwei Deng, Beijing (CN); Longyin Wen, Los Angeles, CA (US); Kai Xu, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/493,999

(22) Filed: Oct. 25, 2023

(65) Prior Publication Data
US 2024/0054714 A1    Feb. 15, 2024

Related U.S. Application Data

(63) Continuation of application No. PCT/CN2022/081313, filed on Mar. 17, 2022.

(30) Foreign Application Priority Data

Apr. 25, 2021   (CN) .......................... 202110450098.0

(51) Int. Cl.
*G06T 13/80* (2011.01)
*G06T 7/20* (2017.01)
(Continued)

(52) U.S. Cl.
CPC ............. *G06T 13/80* (2013.01); *G06T 7/20* (2013.01); *G06T 7/60* (2013.01); *G06T 7/73* (2017.01); *G06V 10/25* (2022.01); *G06V 40/107* (2022.01)

(58) Field of Classification Search
None
See application file for complete search history.

(56) References Cited

U.S. PATENT DOCUMENTS

| | | | |
|---|---|---|---|
| 8,508,534 B1 * | 8/2013 | George | G06T 13/80 345/473 |
| 9,741,149 B2 * | 8/2017 | Myung | G06T 13/80 |

(Continued)

FOREIGN PATENT DOCUMENTS

| | | | | |
|---|---|---|---|---|
| CN | 104780339 A | | 7/2015 | |
| CN | 104902185 A | * | 9/2015 | H04N 5/232 |

(Continued)

OTHER PUBLICATIONS

International Search Report and Written Opinion, International Patent Application No. PCT/CN2022/081313, May 23, 2022, with English translation of Search Report (13 pages).

(Continued)

*Primary Examiner* — James A Thompson
(74) *Attorney, Agent, or Firm* — Fish & Richardson P.C.

(57) ABSTRACT

A method for adding animation to a video includes: detecting whether the hand of a user in the current video frame, which is currently captured, holds an object; if so, determining a target animation corresponding to the object; and determining an animation addition area, which corresponds to the target animation, on the current video frame, and adding the target animation to the animation addition area. Therefore, a corresponding animation special effect is added for an object held by a user in a video, such that the interaction between the user and the handheld object is visually reflected, thereby improving the interestingness of video filming, and providing technical support for improving the viscosity of the user with respect to a video product.

17 Claims, 8 Drawing Sheets

It is detected whether an object is held in a hand of a user, in a current video frame which is currently captured — 101

In the case that the object is held, a target animation corresponding to the object is determined — 102

An animation adding area corresponding to the target animation on the current video frame is determined, and the target animation is added in the animation adding area — 103

(51) Int. Cl.
*G06T 7/60* (2017.01)
*G06T 7/73* (2017.01)
*G06V 10/25* (2022.01)
*G06V 40/10* (2022.01)

(56) References Cited

U.S. PATENT DOCUMENTS

| | | | |
|---|---|---|---|
| 11,392,288 B2 * | 7/2022 | Pittappilly | ............ G06F 3/0482 |
| 2007/0110298 A1 | 5/2007 | Graepel et al. | |
| 2015/0172599 A1 | 6/2015 | Caldwell | |
| 2015/0181111 A1 | 6/2015 | Stewart et al. | |
| 2015/0262402 A1 * | 9/2015 | Heinz, II | ........... H04N 21/6582 345/581 |
| 2016/0063750 A1 * | 3/2016 | Bhargava | ............... G03B 15/08 345/473 |
| 2020/0272309 A1 * | 8/2020 | Xiao | ..................... G06F 3/0486 |
| 2024/0346738 A1 * | 10/2024 | Su | ........................ G11B 27/031 |

FOREIGN PATENT DOCUMENTS

| | | |
|---|---|---|
| CN | 107657652 A | 2/2018 |
| CN | 107995097 A | 5/2018 |
| CN | 109494790 A | 3/2019 |
| CN | 109495790 A | 3/2019 |
| CN | 110858409 A | 3/2020 |
| CN | 110879946 A | 3/2020 |
| CN | 111225232 A | 6/2020 |
| CN | 111553326 A | 8/2020 |
| CN | 111640200 A | 9/2020 |
| CN | 113163135 A | 7/2021 |
| JP | 2000339485 A | 12/2000 |
| JP | 2014203377 A | 10/2014 |
| JP | 2018092313 A | 6/2018 |

OTHER PUBLICATIONS

Office Action issued in Chinese Patent Application No. 202110450098.0, Jun. 22, 2022, with machine translation (14 pages).
Extended European Search Report in European Appln No. 22794386.7, dated Sep. 4, 2024, 12 pages.
Office Action in Japanese Appln. No. 2023-565544, dated Nov. 21, 2024, 8 pages (with English translation).

* cited by examiner

Historical target animation corresponding to historical motion track

METHOD AND APPARATUS FOR ADDING ANIMATION TO VIDEO, AND DEVICE AND MEDIUM

This application is a continuation of International Application No. PCT/CN2022/081313, filed on Mar. 17, 2022 which claims priority to Chinese Patent Application No. 202110450098.0, titled "METHOD AND APPARATUS FOR ADDING ANIMATION TO VIDEO, AND DEVICE AND MEDIUM", filed on Apr. 25, 2021 with the China National Intellectual Property Administration, both of which are incorporated herein by reference in their entireties.

FIELD

The present disclosure relates to the field of video processing technology, and in particular to, a method and apparatus for adding animation to a video, a device, and a medium.

BACKGROUND

With the development of video products (such as short video applications), Users' demands for video products are becoming more and more diverse. For example, the entertaining of the video products is commonly required.

In related technologies, various editing props for the videos are provided in order to meet the entertaining requirement of the users. However, various video editing props have high requirements on the editing skills of the user. In addition, video editing props used for different video are the same, which have no sense of interaction with videos. It is difficult to satisfy the entertaining requirement of the users for video products.

SUMMARY

In order to solve or at least partly solve the above technical problems, a method for adding animation to a video is provided according to an embodiment of the present disclosure. The method includes: detecting, in a current video frame which is currently captured, whether an object is held in a hand of a user; determining a target animation corresponding to the object, in response to the object being held; and determining an animation adding area corresponding to the target animation on the current video frame, and adding the target animation in the animation adding area.

An apparatus for adding animation to a video is further provided according to an embodiment of the present disclosure. The apparatus includes: a first detection module configured to detect whether an object is held in a hand of a user, in a current video frame which is currently captured; a first determination module configured to determine a target animation corresponding to the object, in response to the object being held; and an animation addition module configured to determine an animation adding area corresponding to the target animation on the current video frame, and add the target animation in the animation adding area.

An electronic device is further provided according to an embodiment of the present disclosure. The electronic device includes: a processor; and a memory configured to store instructions executable by the processor, where the processor is configured to read executable instructions from the memory and execute the instructions to implement the method for adding the animation to the video according to the embodiments of the present disclosure.

A computer readable storage medium is further provided according to an embodiment of the present disclosure. The storage medium stores a computer program, where the computer program is configured to implement the method for adding the animation to the video according to the embodiments of the present disclosure.

Compared with the conventional technology, the technical solutions of the embodiments of the present disclosure have advantages below.

Whether an object is held in a hand of a user is detected in a current video frame which is currently captured; in the case that the object is held, a target animation corresponding to the object is determined; finally, an animation adding area corresponding to the target animation on the current video frame is determined, and the target animation is added in the animation adding area. In this way, corresponding animation special effects can be added to the object held in the hand of the user in the video, which visually reflects the interaction between the user and the hand-held object, improves the entertainment of video capturing, and provides technical support for improving the stickiness of users and video products.

BRIEF DESCRIPTION OF THE DRAWINGS

In conjunction with the drawings and with reference to the following embodiments, the above and other features, advantages and aspects of the embodiments of the present disclosure are more apparent. The same or similar reference numerals represent the same or similar elements through the drawings. It should be understood that the drawings are schematic and the components and elements are unnecessarily drawn to scale.

DETAILED DESCRIPTION OF EMBODIMENTS

The embodiments of the present disclosure are described in detail below with reference to the drawings. Although some embodiments of the present disclosure are shown in the drawings, it should be understood that the present disclosure may be implemented in various forms and should not be limited to the embodiments described herein. Rather, the embodiments are provided for thoroughly and completely understanding the present disclosure. It should be understood that the drawings and the embodiments of the present disclosure are exemplary and are not intended to limit the protection scope of the present disclosure.

It should be understood that the steps in the method embodiments of the present disclosure may be performed in different orders and/or in parallel. In addition, the method embodiments may include an additional step and/or a step shown herein may be omitted. The scope of the present disclosure is not limited in this aspect.

The term "include" and its variations in the present disclosure means open-ended inclusion, i.e., "including but not limited to". The term "based on" means "based at least in part on". The term "one embodiment" means "at least one embodiment". The term "another embodiment" means "at least one additional embodiment". The term "some embodiments" means "at least some embodiments". The definitions of other terms are provided in the following descriptions.

It should be noted that the wordings such as "first" and "second" used in the present disclosure are used to distinguish different apparatuses, modules or units, and are not used to limit a sequential order or interdependence of the functions performed by the apparatuses, modules or units.

It should be noted that the wordings such as "one" and "multiple" used in the present disclosure are illustrative and not restrictive. Those skilled in the art should understand that the wordings should be understood as "one or more" unless otherwise expressly indicated in the context.

The names of messages or information exchanged between multiple apparatuses in the embodiments of the present disclosure are only for illustrative purposes, and are not intended to limit the scope of the messages or information.

In order to solve the problem that it is difficult to satisfy the entertaining requirement of the user for the video editing in the process of post-editing of the video, a method for adding animation is provided according to an embodiment of the present disclosure. In this method, the animation effect can be flexibly added to a video frame, which visually reflects the interaction between the user and the hand-held object. Different animation adding effects are realized in multiple dimensions such as the added animations and the added areas of the animations, which meet the entertaining requirement of the user for the video editing.

Hereinafter, the method will be described in conjunction with specific embodiments. The method for adding the animation to the video in the embodiments may be applied to any video product, such as a short video application.

Figure 1:
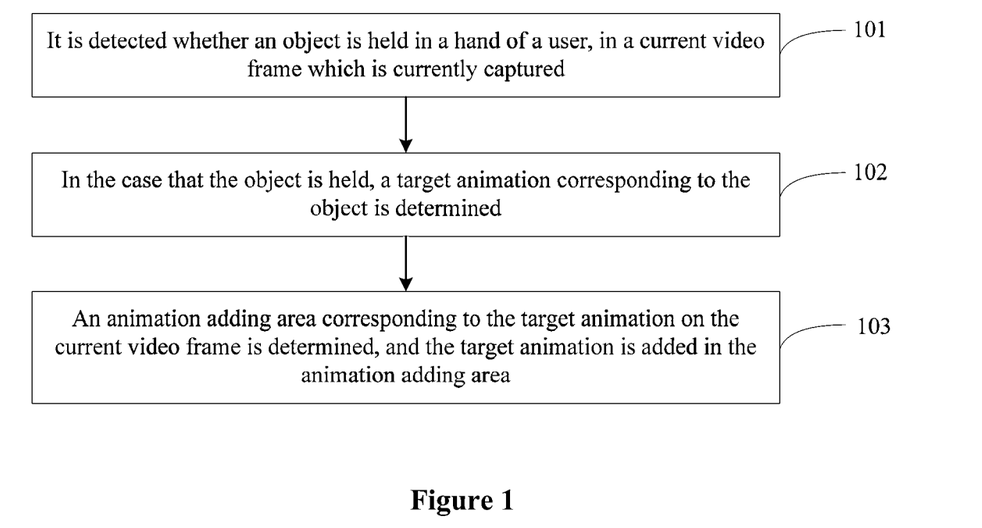
FIG. 1 is a schematic flowchart of a method for adding animation to a video according to an embodiment of the present disclosure.

FIG. 1 illustrates a schematic flowchart of a method for adding animation to a video according to an embodiment of the present disclosure. The method may be implemented by an apparatus for adding animation to a video. The apparatus may be implemented by software and/or hardware, and generally may be integrated in an electronic device. As shown in FIG. 1, the method includes steps 101 to 103 as follows.

In step 101, it is detected whether an object is held in a hand of a user, in a current video frame which is currently captured.

It should be noted that the processed object in this embodiment is the current video frame which is currently captured. In this way, animations are added to each current video frame which is currently captured, to realize the real-time addition of animation effects and satisfy the requirement for real-time video editing.

Apparently, in some optional embodiments, post-processing may be performed on the video frame in the video that has already captured, to add the animation effect. The animation adding method for the video frame in the video that has already captured is the same as that of the current video frame captured in real time, which will not be repeated here.

In this embodiment, in the case of detecting that the current video frame includes the hand of the user, it is detected whether an object is held in the hand of the user, in the current video frame. Hence, the subsequent adding animation processing is applied to the scenario where the user interacts with the object held in hand. The object may be any object held in the hand of the user. Alternatively, the object may be some specific objects, such as objects in specific shapes or specific colors, etc. When the object is any object, a corresponding animation is added only if the user holds the object. When the object is a specific object, a corresponding animation is added only if the user holds the specific object, which is more entertaining.

It should be noted that the method of detecting whether the object is held in the hand of the user in the current video frame which currently captured varies in different application scenarios. Examples are as follows.

First Example

In this example, a hand outline of the hand of the user is detected, and an object outline of the object is detected. Then, it is determined whether the hand outline overlaps with the object outline. In the case that the hand outline overlaps with the object outline, it is determined that the object is held in the hand of the user.

Second Example

In this example, a deep learning model is trained in advance according to the deep learning technology. The deep learning model learns the image feature of the image in which the user holds the object in his hand. Then, the current video frame is inputted into the deep learning model, and whether the object is held in the hand of the user is determined based on the output of the deep learning model.

In step 102, in the case that the object is held, a target animation corresponding to the object is determined.

In this embodiment, if it is detected that the object is held in the hand of the user, the condition for adding animation is satisfied. Thus, the target animation corresponding to the object is determined.

In step 103, an animation adding area corresponding to the target animation on the current video frame is determined, and the target animation is added in the animation adding area.

In this embodiment, in order to further improve the entertainment of animation addition, the animation addition area corresponding to the target animation on the current video frame is determined. The animation addition area may include, but be not limited to, an area where the object is located, an entire area of the current video frame, an area where the other object is located, etc.

Further, the target animation is added in the animation adding area. In this way, interactions between the user and the object are implemented by means of animations as long as the user holds the object, which has an enhanced entertainment.

In order to make those skilled in the art more clearly understand the method for adding the animation of the embodiment of the present disclosure, a case that the method for adding animation is applied to a prop addition scenario of a short video application is provided below as an example for illustration.

In this embodiment, in the process of the user capturing a video, in response to a trigger for a hand-held object animation adding prop in the toolbar, it is detected whether an object is held in a hand of the user, in a current video frame which is currently captured. If no object is detected, a prompt message "Try to take something first" is displayed, which prompts the user to grab an object.

If it is detected that an object is held in the hand of the user, the target animation corresponding to the object is determined, the animation adding area corresponding to the target animation on the current video frame is determined, and then the target animation is added in the animation adding area.

Based on the above description, with the method for adding the animation to the video according to the embodiments of the present disclosure, it detects whether an object is held in a hand of a user in a current video frame which is currently captured; in a case that the object is held, a target animation corresponding to the object is determined; finally, an animation adding area corresponding to the target animation on the current video frame is determined, and the target animation is added in the animation adding area. In this way, corresponding animation special effects can be added to the object held in the hand of the user in the video, which visually reflects the interaction between the user and the hand-held object, improves the entertainment of video capturing, and provides technical support for improving the stickiness of users and video products.

When the animation is added to the scenario where the object is held in the hand of the user, the displayed editing effects vary with different added target animations. Therefore, the methods of determining the target animations corresponding to the objects are different in different application scenarios. Examples are as follows.

First Example

Figure 2:
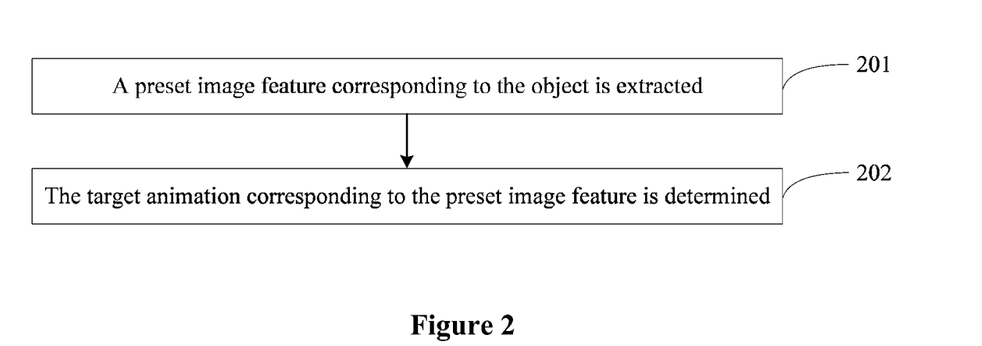
FIG. 2 is a schematic flowchart of a method for adding animation to a video according to another embodiment of the present disclosure.

In this example, as shown in FIG. 2, the step of determining the target animation corresponding to the object includes steps 201 to 202.

In step 201, a preset image feature corresponding to the object is extracted.

In this embodiment, image processing technology may be used to extract the preset image feature corresponding to the object. The preset image feature may be any feature that is used to determine the target animation. In some possible embodiments, the preset image feature include at least one of: a shape feature of the object (e.g., a square feature, a circular feature, etc.), a color feature of the object (e.g., red feature, green feature, etc.), a size feature of the object (e.g., much larger or much smaller than the hand of the user, etc.), an object type of the object (e.g., red envelopes, gifts, diamond rings, etc.), a position feature of the object (e.g., above or below the hand, the upper end or the lower end of the picture, etc.), a gesture feature of the hand of the user holding the object (e.g., a holding gesture feature or a pinching gesture feature of the user, etc.).

In step 202, the target animation corresponding to the preset image feature is determined.

It should be understood that the target animation corresponding to the preset image feature may be determined by querying a preset database, or automatically generated by an animation generation apparatus based on the preset image feature. The preset database includes a correspondence relationship between preset image features and target animations. Thus, the target animation corresponding to the preset image feature may be determined by querying the preset database.

As an example, when the preset image feature is a circular feature, the corresponding target animation is flames. When the preset image feature is green, the corresponding target animation is a flower, etc.

As an example, the preset image feature is the gesture feature of the hand of the user. For example, the gesture of the hand of the user is clicking the object. In this case, the target animation may be determined as a texture changing animation, such as a freezing animation, a "Midas Touch" animation and the like. The target animation adding area is the area where the object is located, and thus the animation effect such as "Midas Touch" and "Generating flowers by touch" may be realized.

Second Example

In this example, multiple material sets corresponding to the target animation are determined in advance. Then, after it is determined that the current video frame includes an object held in the hand of the user, a target material is randomly determined from each material set in the multiple material sets, and the target animation is generated by combining all the target materials.

Figure 3:
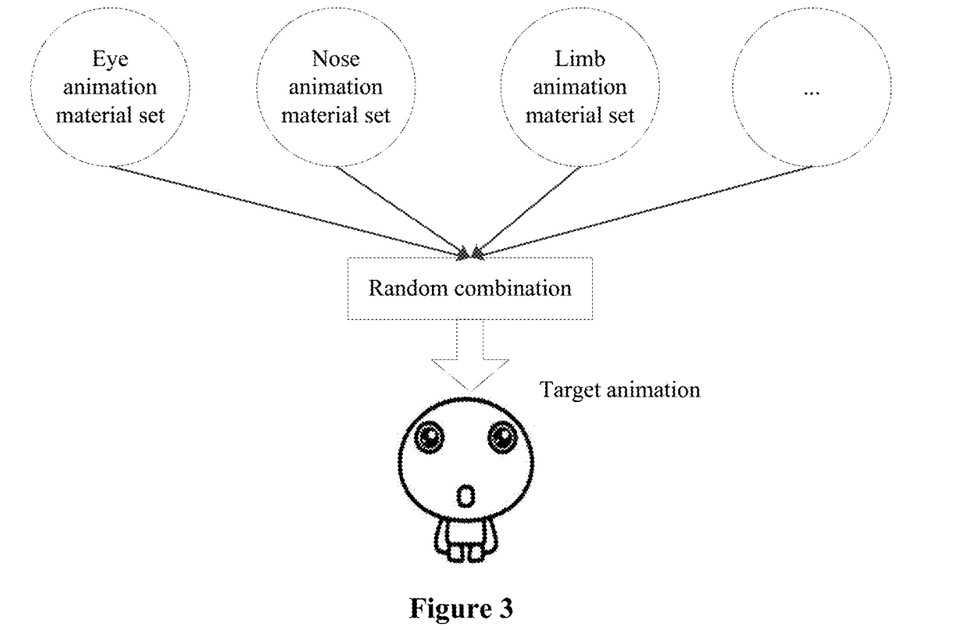
FIG. 3 is a schematic diagram of a scenario of adding animations to a video according to an embodiment of the present disclosure.

As an example, as shown in FIG. 3, the multiple material sets corresponding to the target animation are an eye animation material set, a nose animation material set, a limb animation material set, etc. The eye animation, the nose animation and the limb animation corresponding to the object are determined from the respective material sets and are combined to obtain the final target animation.

Based on the above description, with the method for adding the animation to the video according to the embodiments of the present disclosure, the target animation corresponding to the object is flexibly determined to further improve the visualization of the interaction between the user hand and the object, thereby improving the entertainment of the video.

It is easy to understand that the display effects of the current video frame are different depending on the animation adding area. The different animation adding areas are described below for illustration.

First Example

In this example, the image area where the object is located is identified, and then the image area where the object is located is determined as an animation adding area. Based on this, the target animation is added to the object, which improves the visualization of the interaction between the user hand and the object.

Figure 4:
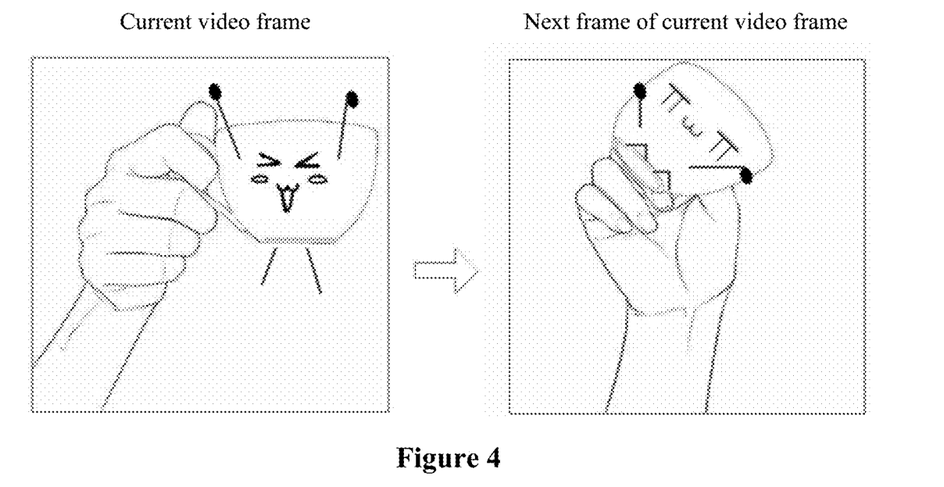
FIG. 4 is a schematic diagram of a scenario of adding animations to a video according to another embodiment of the present disclosure.

As an example, referring to FIG. 4, when the user holds a "cup" in his hand, the corresponding target animation is an emoji animation, and the emoji animation may be added to the "cup" to reflect a sense of an interaction of the "cup" held in the hand of the user.

In addition, different current video frames may match different target animations, and different animation effects may be reflected through object animation changes. For example, referring to FIG. 4, the "cup" in different video frames may be added with different emoji animations. In this way, the "emotion changes" of different "cups" held in the user hand may be anthropomorphically presented.

Second Example

In this example, the associated object of the object is determined, where the associated object may be pre-matched with the image feature of the object. For example, when the object is circular, the associated object is a circular object; or may be a preset specific object, e.g., a human face and so on. The associated object may also be a preset area of the video frame, e.g., the upper left corner area of the video frame.

Figure 5:
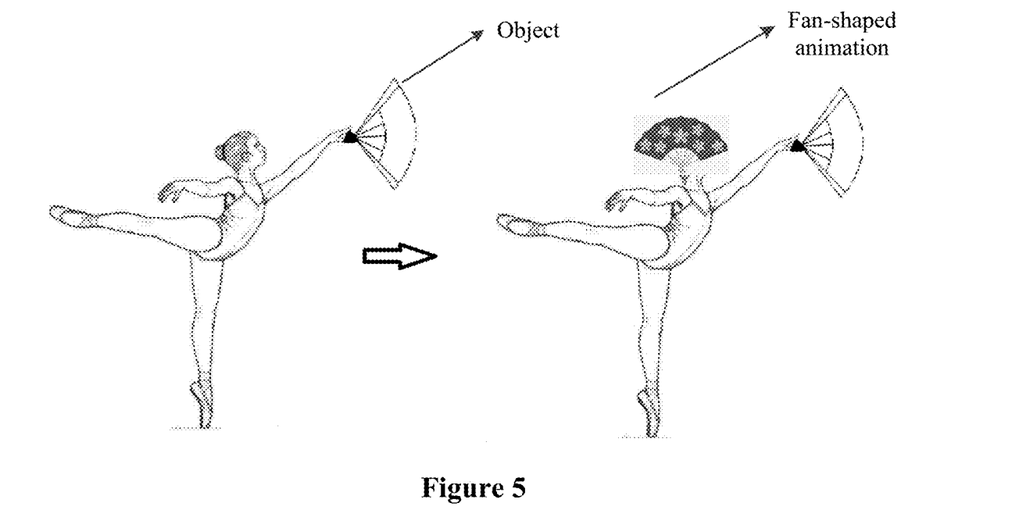
FIG. 5 is a schematic diagram of a scenario of adding animations to a video according to another embodiment of the present disclosure.

For example, the associated object is a human face, and the target animation corresponds to the shape of the object. As shown in FIG. 5, when the user holds a fan-shaped object, the face of the user displays a fan-shaped animation, realizing an entertaining effect of mapping animation.

Figure 6:
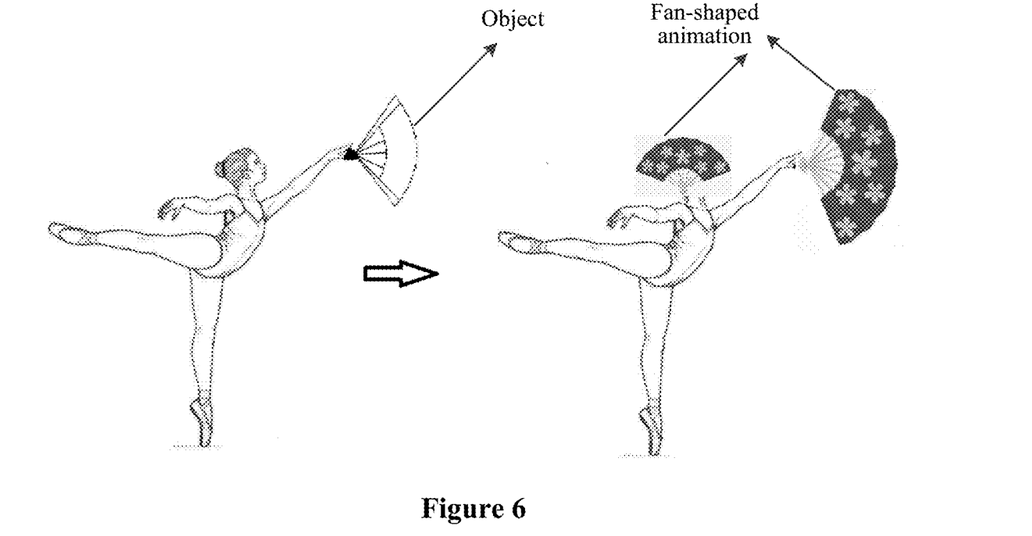
FIG. 6 is a schematic diagram of a scenario of adding animations to a video according to another embodiment of the present disclosure.

Apparently, in this example, the area where the object is located and the area where the associated object is located may both be used as animation addition areas, as shown in FIG. 6. When the target animation corresponds to the shape of the object, as shown in FIG. 6, when the user holds a fan-shaped object, the fan-shaped animations are displayed on the user face and the object in the user hand, realizing an entertaining effect of mapping animation.

Third Example

In this embodiment, in order to create a great atmosphere, for a specific type of object, the entire image area of the current video frame is determined as the animation adding area.

In other words, in this embodiment, the object type of the object is determined by learning the image feature of the object in the deep learning technology. In the case that the object type belongs to a preset type, an entire image area of the current video frame is determined as the animation adding area.

Figure 7:
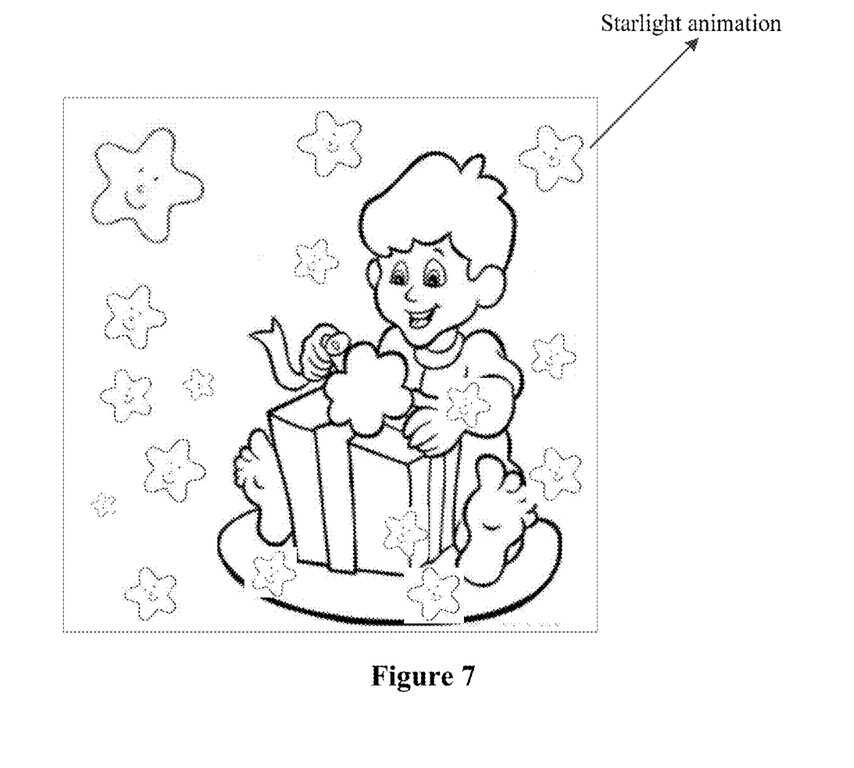
FIG. 7 is a schematic diagram of a scenario of adding animations to a video according to another embodiment of the present disclosure.

For example, when the object type of the object is determined as "red packet", the entire image area of the current video frame is determined as the animation adding area, in order to create a great atmosphere. As shown in FIG. 7, the "starlight" animation effect may be displayed in the current video frame corresponding to the object type of unwrapping the gift in full screen, to create a sense of gift atmosphere.

The above example illustrates the method for determining the target animation adding area in the current frame. In another embodiment of the present disclosure, in order to further improve the entertainment of the video, the animation on each previously captured video frame may be retained on the current video frame to form a trajectory tracking animation display effect.

Figure 8:
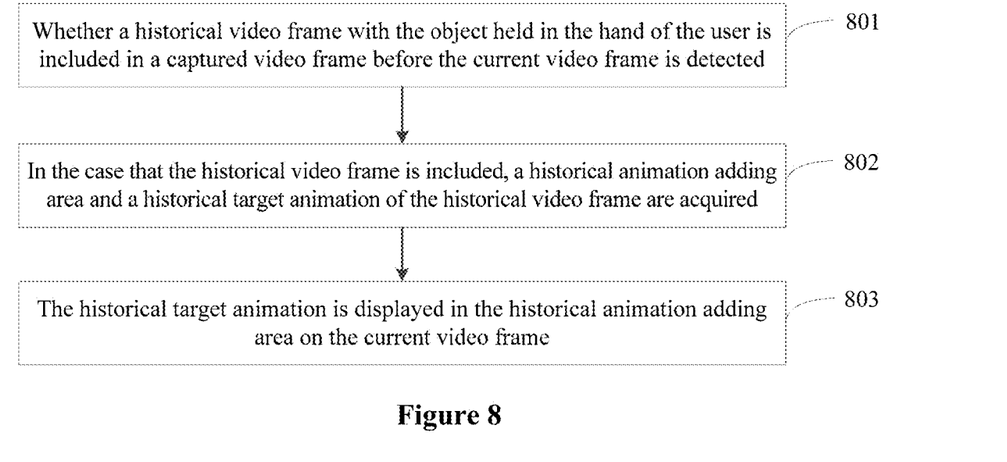
FIG. 8 is a schematic flowchart of a method for adding animation to a video according to another embodiment of the present disclosure.

In one embodiment of the present disclosure, as shown in FIG. 8, before adding the target animation to the animation adding area, the method further includes steps 801 to 803.

In step 801, whether a historical video frame with the object held in the hand of the user is included in a captured video frame before the current video frame is detected.

In step 802, in the case that the historical video frame is included, a historical animation adding area and a historical target animation of the historical video frame are acquired.

In other words, it is determined whether the current video frame is the first video frame in the captured video. If it is not the first video frame, the historical video frame is determined, and the historical animation adding area and the historical target animation of the historical video frame are acquired.

In step 803, the historical target animation is displayed in the historical animation adding area on the current video frame.

In this embodiment, in the case that the historical animation adding area and the historical target animation when the user holds the object are acquired, the historical target animation is displayed in the historical animation adding area on the current video frame, realizing an animation memory effect.

Figure 9:
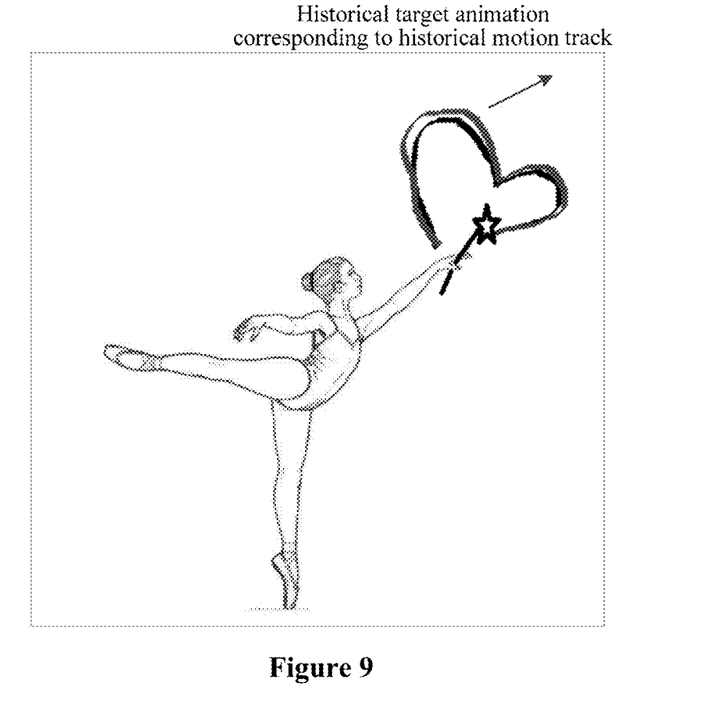
FIG. 9 is a schematic diagram of a scenario of adding animations to a video according to another embodiment of the present disclosure.

For example, the animation adding areas are the areas where the objects are located and the target animation are the flash animations. Thus, as shown in FIG. 9, the flash animation corresponding to the historical motion track of the object is displayed on the current video frame, realizing the trajectory tracking effect. In this way, the user can realize interactive operations such as "drawing a heart" with the object by using this animation display method.

The above description is only an entertainment video processing approach for adding animation. In practical application, with the addition of target animation, other content, such as sound data, may be added. That is, the sound data corresponding to the target animation is determined. In some possible embodiment, a correspondence relationship between the target animation and the sound data may be stored in advance. In this way, the corresponding sound data may be determined by querying the correspondence relationship. Subsequently, the sound data may be played while adding the target animation. As an example, when the user holds a "sugar cube", the sound data of holding the "sugar cube" may be added to enhance the sense of interaction and improve the entertainment for capturing the video.

Based on the above description, with the method for adding the animation to the video according to the embodiments of the present disclosure, the animation adding area may be selected flexibly. Based on the cooperation of the animation adding area and the target animation, various animation display effects are realized and the entertainment for capturing video frames is further improved.

Based on the above embodiments, in order to further improve the entertainment for video capturing, the motion track of the object held in the hand of the user may be tracked. Even if the object is detached from the hand of the user, animations may be displayed along with the movement of the object.

Figure 10:
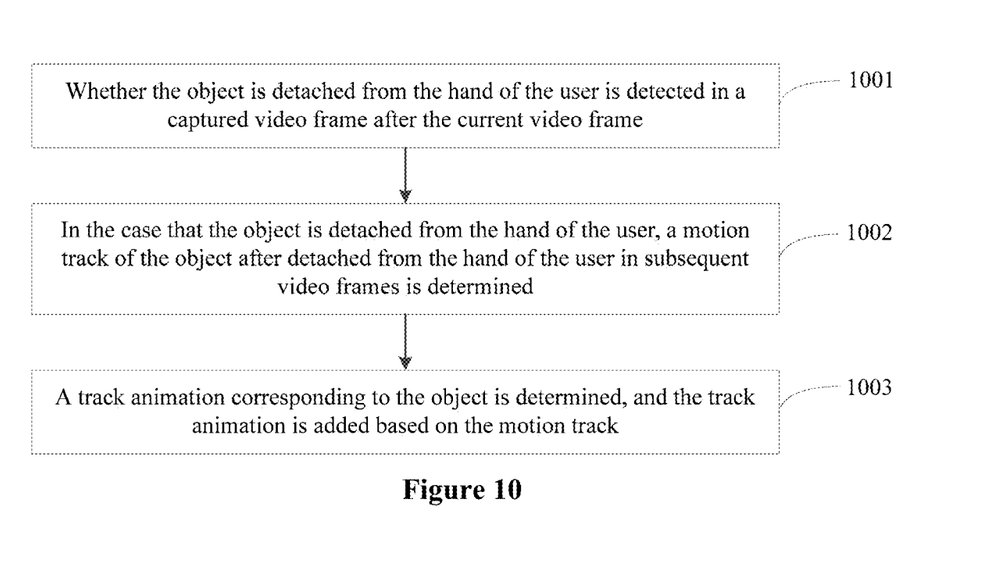
FIG. 10 is a schematic flowchart of a method for adding animation to a video according to another embodiment of the present disclosure.

In an embodiment of the present disclosure, as shown in FIG. 10, the method further includes steps 1001 to 1003.

In step 1001, whether the object is detached from the hand of the user is detected in a captured video frame after the current video frame.

In this embodiment, whether the object is detached from the hand may be determined by determining no overlap between the object outline and the hand outline of the user. Alternatively, a deep image feature of the captured video frame after the current video frame is identified in a deep learning approach; and whether the object is detached from the user hand may be then determined based on the deep image feature.

In step 1002, in the case that the object is detached from the hand of the user, a motion track of the object after detached from the hand of the user in subsequent video frames is determined.

In order to realize animation addition along with the detachment track of the object, the motion track of the object detached from the hand of the user on a corresponding video frame is determined.

In some possible implementations, on determining that the object is detached from the hand of the user, a position of the object on each corresponding video frame is determined, and the positions of the object on all previous corresponding video frames are superposed in the capturing order, to obtain the motion track of the object on the corresponding video frame.

In some possible implementations, a first position of the object on the corresponding subsequent video frame after the object is detached is determined, and a second position of the object held in the hand of the user on a video frame before the object is detached is determined. The motion track from the second position to the first position is directly generated, where the motion track may be any track shape.

In step 1003, a track animation corresponding to the object is determined, and the track animation is added based on the motion track.

In this embodiment, the track animation corresponding to the object may be the unified and default animation, which is preset by the video capturing application. Alternatively, the track animation corresponding to the object may be a track animation corresponding to the image feature of the object. In other words, a correspondence relationship between the image feature of the object and the track animation is constructed in advance. Based on the correspondence relationship, the track animation corresponding to the object is determined. Alternatively, the track animation corresponding to the object may be a track animation randomly selected from a preset track material database.

In this embodiment, the track animation is added following the object areas where the object is located, and the corresponding track animation is added in the image area covered by the motion track of the object.

Figure 11:
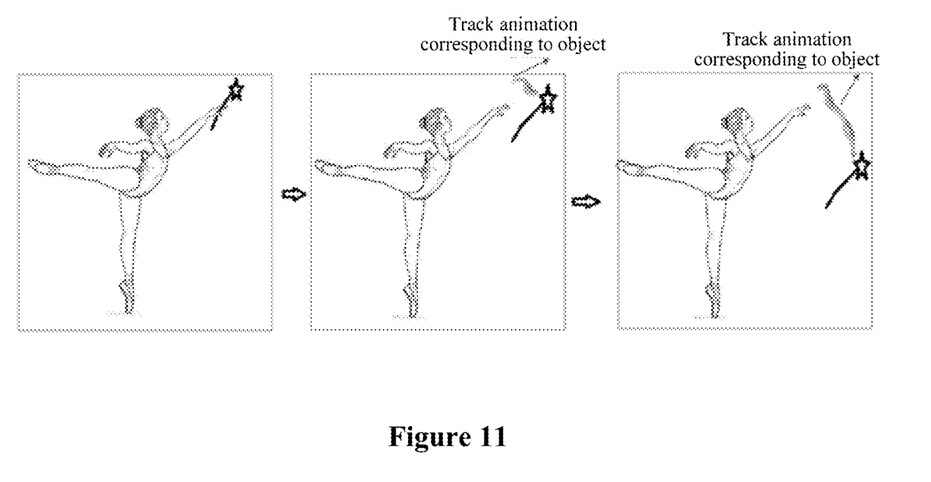
FIG. 11 is a schematic diagram of a scenario of adding animations to a video according to another embodiment of the present disclosure.

As an example, as shown in FIG. 11, in the case that the current video frame is "the dancer is holding a fairy stick" and the "fairy stick" is detached from the hand of the "dancer" in the following video frames, the corresponding track animation is displayed directly according to the motion track of the detached "fairy stick".

Based on the above description, with the method for adding the animation to the video according to the embodiments of the present disclosure, the animation can be added along with the motion track of the object after detached from the hand, which creates an animation effect of throwing the object, to further improve the entertainment of adding animation to video.

In order to implement the above embodiments, an apparatus for adding animation to a video is further provided according to the present disclosure.

Figure 12:
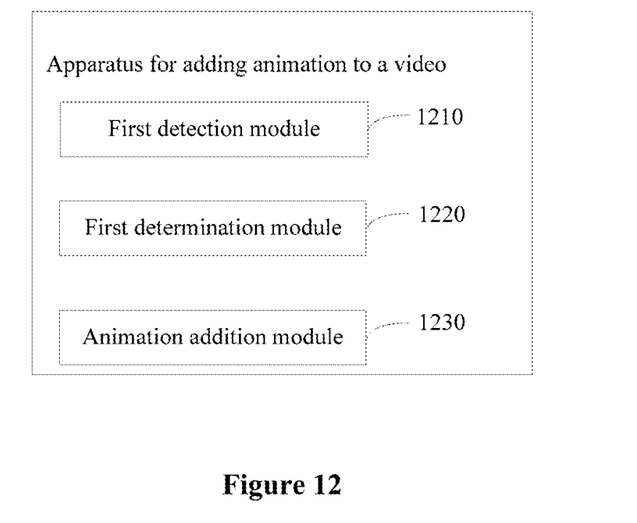
FIG. 12 is a schematic structural diagram of an apparatus for adding animation to a video according to an embodiment of the present disclosure.

FIG. 12 is a schematic structural diagram of an apparatus for adding animation to a video according to an embodiment of the present disclosure. The apparatus may be implemented by software and/or hardware, and generally may be integrated into an electronic device. As shown in FIG. 12, the apparatus for adding the animation to the video includes: a first detection module 1210, a first determination module 1220 and an animation addition module 1230.

The first detection module 1210 is configured to detect whether an object is held in a hand of a user, in a current video frame which is currently captured.

The first determination module 1220 is configured to determine a target animation corresponding to the object, in the case that the object is held.

The animation addition module 1230 is configured to determine an animation adding area corresponding to the target animation on the current video frame, and add the target animation in the animation adding area.

The above apparatus for adding the animation to the video according to the embodiments of the present disclosure can implement the method for adding the animation to the video according to any embodiment of the present disclosure, which has corresponding functional modules and beneficial effects for implementing the method.

Based on the above description, with the apparatus for adding the animation to the video of the embodiments of the present disclosure, it detects whether an object is held in a hand of a user in a current video frame which is currently captured. In the case that the object is held, a target animation corresponding to the object is determined. Finally, an animation adding area corresponding to the target animation on the current video frame is determined, and the target animation is added in the animation adding area. In this way, a corresponding animation special effect can be added to the object held in the hand of the user in the video, which visually reflects the interaction between the user and the hand-held object, improves the entertainment of video capturing, and provides technical support for improving the stickiness of users and video products.

In an embodiment of the present disclosure, the first determination module 1220 is specifically configured to extract a preset image feature corresponding to the object; and determine the target animation corresponding to the preset image feature by querying a preset database.

The above apparatus for adding the animation to the video according to the embodiments of the present disclosure can implement the method for adding the animation to the video according to any embodiment of the present disclosure, which has corresponding functional modules and beneficial effects for implementing the method.

Based on the above description, with the apparatus for adding the animation to the video according to the embodiments of the present disclosure, the target animation corresponding to the object is flexibly determined to further improve the visualization of the interaction between the user hand and the object, thereby improving the entertainment of the video.

In an embodiment of the present disclosure, the animation addition module 1230 is specifically configured to determine an associated object of the object; detect whether the current video frame includes the associated object; and determine an area where the associated object is located as the animation adding area, in the case that the current video frame includes the associated object.

In an embodiment of the present disclosure, the animation addition module 1230 is specifically configured to determine an object type of the object; determine an entire image area of the current video frame as the animation adding area in the case that the object type belongs to a preset type.

Figure 13:
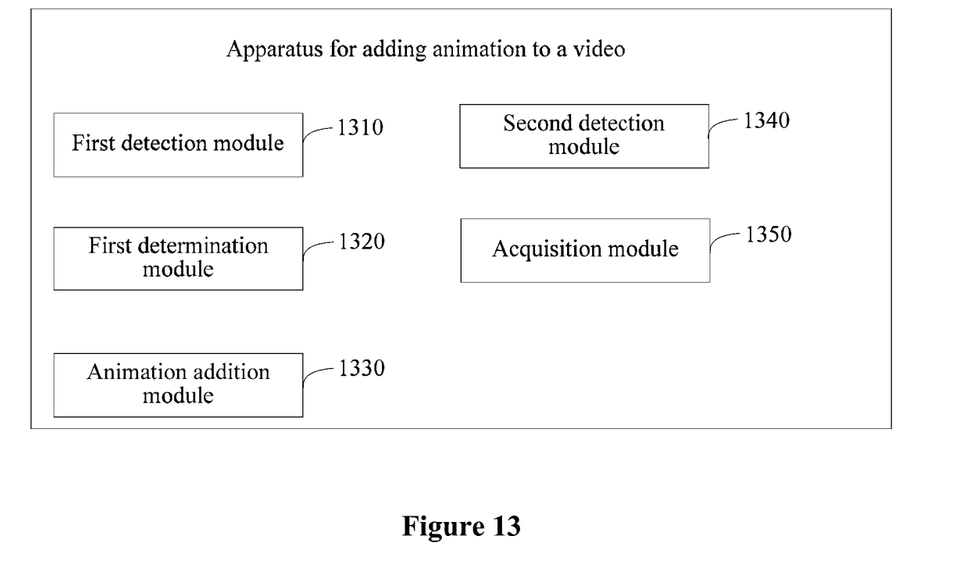
FIG. 13 is a schematic structural diagram of an apparatus for adding animation to a video according to another embodiment of the present disclosure.

In an embodiment of the present disclosure, as shown in FIG. 13, the apparatus for adding the animation to the video includes: a first detection module 1310, a first determination module 1320, an animation addition module 1330, a second detection module 1340 and an acquisition module 1350. The functions of the first detection module 1310, the first determination module 1320 and the animation addition module 1330 are the same as those of the first detection module 1210, the first determination module 1220 and the animation addition module 1230 in the above-mentioned embodiments, which will not be repeated here.

In this embodiment, the second detection module 1340 is configured to acquire historical video frames captured before the current video frame.

The acquisition module 1350 is configured to acquire a historical animation adding area and a historical target animation of the historical video frame, in the case that the historical video frame is included.

The animation addition module 1330 is further configured to display the historical target animation in the historical animation adding area on the current video frame.

The above apparatus for adding the animation to the video according to the embodiments of the present disclosure can implement the method for adding the animation to the video according to any embodiment of the present disclosure, which has corresponding functional modules and beneficial effects for implementing the method.

Based on the above description, with the apparatus for adding the animation to the video according to the embodiments of the present disclosure, the animation adding area may be flexibly selected. Based on the cooperation of the animation adding area and the target animation, various animation display effects may be realized, further improving the entertainment for capturing video frames.

Figure 14:
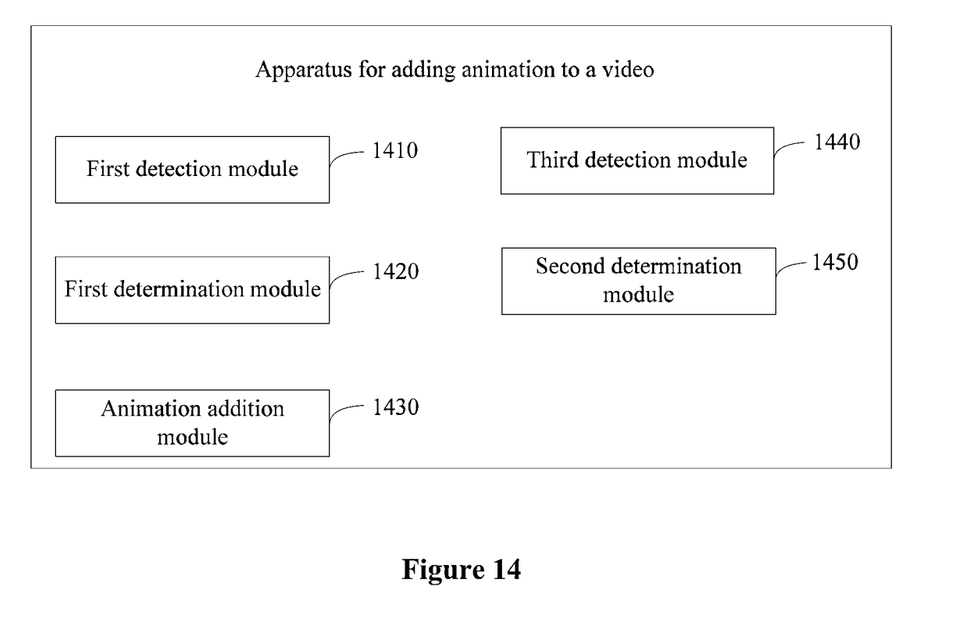
FIG. 14 is a schematic structural diagram of an apparatus for adding animation to a video according to another embodiment of the present disclosure.

In an embodiment of the present disclosure, as shown in FIG. 14, an apparatus for adding animation to a video includes: a first detection module 1410, a first determination module 1420, an animation addition module 1430, a third detection module 1440, and a second determination module 1450. The first detection module 1410, the first determination module 1420 and the animation addition module 1430 have the same functions as the first detection module 1210, the first determination module 1220 and the animation addition module 1230 in the above-mentioned embodiments, which will not be repeated here.

The third detection module 1440 is configured to detect whether the object is detached from the hand of the user, in a video frame captured after the current video frame.

The second determination module 1450 is configured to determine a motion track of the object after detached from the hand of the user on corresponding subsequent video frames, in a case that the object is detached from the hand of the user.

The animation addition module 1430 is further configured to determine a track animation corresponding to the object, and add the track animation based on the motion track.

The above apparatus for adding the animation to the video according to the embodiments of the present disclosure can implement the method for adding the animation to the video according to any embodiment of the present disclosure, which has corresponding functional modules and beneficial effects for implementing the method.

Based on the above description, with the apparatus for adding the animation to the video according to the embodiments of the present disclosure, animations can be added along with the motion track of the object after detached from the hand, which creates an animation effect of throwing the object, to further improve the entertainment of adding the animation to the video.

In order to implement the above embodiments, a computer program product is further provided according to the present disclosure, which includes computer programs/instructions. The computer programs/instructions, when executed by a processor, implements the method for adding the animation to the video described in the above embodiments.

Figure 15:
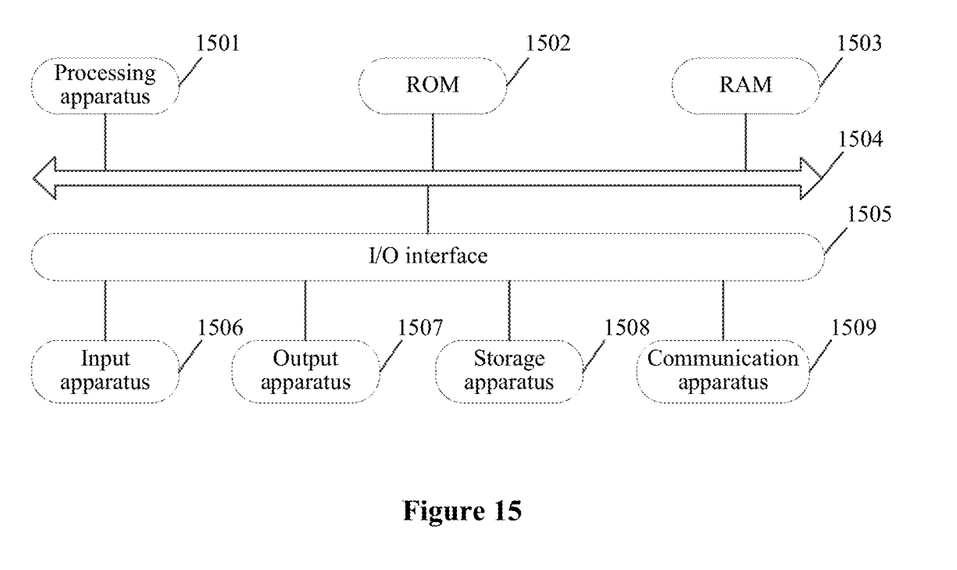
FIG. 15 is a schematic structural diagram of an electronic device according to an embodiment of the present disclosure.

FIG. 15 is a schematic structural diagram of an electronic device according to an embodiment of the present disclosure.

Referring to FIG. 15 hereinafter, FIG. 15 illustrates a schematic structural diagram which is suitable for implementing the electronic device 1500 according to an embodiment of the present disclosure. The electronic device 1500 in the embodiment of the present disclosure may include, but not limited to, mobile terminals, such as mobile phones, laptops, digital broadcast receivers, PDAs (personal digital assistants), PADs (tablet computers), PMPs (portable multimedia players), vehicle-mounted terminals (such as in-vehicle navigation terminals) and the like, and stationary terminals such as digital TVs, desktop computers and the like. It should be noted that the electronic device shown in FIG. is only an example and should not impose any limitations on the functions and scope of use of the embodiments of the present disclosure.

As shown in FIG. 15, the electronic device 1500 may include a processing apparatus (such as a central processor and a graphic processor) 1501. The processing apparatus 1501 may perform various appropriate actions and processing based on programs stored in a read-only memory (ROM) 1502 or programs uploaded from a storage apparatus 1508 to a random access memory (RAM) 1503. Various programs and data required for operations of the electronic device 1500 are also stored in the RAM 1503. The processing apparatus 1501, the ROM 1502 and the RAM 1503 are connected to each other through the bus 1504. An input/output (I/O) interface 1505 is also connected to the bus 1504.

Generally, the following apparatuses may be connected to the I/O interface 1505: an input apparatus 1506 such as a touch screen, a touch panel, a keyboard, a mouse, a camera, a microphone, an accelerometer, and gyroscope; an output apparatus 1507 such as a liquid crystal display (LCD), a loudspeaker and a vibrator; a storage apparatus 1508 such as a magnetic tape and a hard disk; and a communication apparatus 1509. The communication apparatus 1509 may allow the electronic device 1500 to communicate with other device in a wired or wireless manner to exchange data. Although FIG. 15 illustrates the electronic device 1500 provided with various apparatuses, it should be understood that not all shown apparatuses are required to be implemented or included. Alternatively, more or less apparatuses may be implemented or included.

Particularly, according to the embodiments of the present disclosure, the process described above in conjunction with flowcharts may be implemented as a computer software program. For example, a computer program product is further provided according to an embodiment of the present disclosure, including a computer program carried on a non-transitory computer readable medium. The computer program includes the program codes for implementing the methods as shown in the flowcharts. In the embodiment, the computer program may be downloaded and installed from the network via the communication apparatus 1509, or installed from the storage apparatus 1508, or installed from the ROM 1502. When the computer program is executed by the processing apparatus 1501, the functions defined in the methods for adding animation to video according to the embodiments of the present disclosure are performed.

It should be noted that, the computer readable medium described in the present disclosure may be a computer readable signal medium, a computer readable storage medium or any combination thereof. The computer readable storage medium may include but not limited to a system, an apparatus or a device in an electric, magnetic, optical, electromagnetic, infrared or a semiconductor form, or any combination thereof. The more specific examples of the computer readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof. In the present disclosure, the computer readable storage medium may be a tangible medium including or storing programs. The programs may be used by an instruction execution system, apparatus or device, or may be used in combination with the instruction execution system, apparatus or device. In the present disclosure, a computer readable signal medium may include a data signal in a baseband or propagated as a part of carrier. The computer readable signal medium carries computer readable program codes. The propagated data signal may be in a variety of forms, and include but not limited to an electromagnetic signal, an optical signal or any appropriate combination thereof. The computer readable signal medium may further be any computer readable medium other than the computer readable storage medium. The computer readable signal medium may send, propagate or transmit programs used by the instruction execution system, apparatus or device or the programs used in combination with the instruction execution system, apparatus or device. The program code embodied in the computer readable medium may be transmitted via any appropriate medium, including but not limited to an electric wire, an optical fiber, radio frequency (RF) or any appropriate combination thereof.

The above computer readable medium may be included in the electronic device above or may stand alone without being assembled into the electronic device.

The above computer readable medium carries one or more programs. The one or more programs, when executed by the electronic device, cause the electronic device to: detect, in a current video frame which is currently captured, whether an object is held in a hand of a user; determine a target animation corresponding to the object, in a case that the object is held; and determine an animation adding area corresponding to the target animation on the current video frame, and add the target animation in the animation adding area. In this way, corresponding animation special effects can be added to the object held in the hand of the user in the video, which visualizes the interaction between the user and the hand-held object, improves the entertainment of video capturing, and provides technical support for improving the stickiness of users and video products.

In an embodiment of the present disclosure, computer program codes for performing operations of the present disclosure may be written by using one or more program design language or any combination. The program design language includes but not limited to object oriented program design language such as Java, Smalltalk and C++, and further includes conventional process-type program design language such as "C" or similar program design language. The program codes may be completely or partially executed on a user computer, performed as an independent software packet, partially executed on the user computer and partially executed on a remote computer, or completely executed on the remote computer or a server. In a case of involving the remote computer, the remote computer may connect to the user computer via any type of network such as a local area network (LAN) and a wide area network (WAN). Alternatively, the remote computer may connect to an external computer (such as achieving internet connection by services provided by the internet network service provider).

The flowcharts and block diagrams in the drawings illustrate architectures, functions and operations which may be implemented by the system, method and computer program product according to the embodiments of the present disclosure. Each block in the flowcharts or the block diagram may represent a module, a program segment or part of codes including executable instruction(s) for implementing specified logic functions. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should also be noted that each block in the block diagram and/or flow chart and a combination of the blocks in the block diagram and/or flow chart may be implemented by a dedicated hardware-based system that performs specified functions or operations, or may be realized by a combination of dedicated hardware and computer instructions.

The units mentioned in the description of the embodiments of the present disclosure may be implemented by means of software or otherwise by means of hardware. A name of the units does not constitute a limitation to the units in some case.

The functions described above herein may be at least partially performed by one or more hardware logic components. For example, the hardware logic component may include but not limited to: a field programmable gate array (FPGA), an application specific integrated circuit (ASIC), an application specific standard product (ASSP), a system on chip (SOC), a complex programmable logic device (CPLD) and so on.

It the context of the present disclosure, the machine readable medium may be a tangible medium including or storing programs. The programs may be used by an instruction execution system, apparatus or device, or may be used in combination with the instruction execution system, apparatus or device. The machine readable medium may be a machine readable signal medium or a machine readable storage medium. The machine readable medium may include but not limited to a system, an apparatus or a device in an electric, magnetic, optical, electromagnetic, infrared or a semiconductor form, or any appropriate combination thereof. The machine readable storage medium may include but not limited to electric connection of one or more wires, a portable computer magnetic disk, a hard disk, a random access memory (RAM), a read-only memory (ROM), an erasable programmable read only memory (EPROM or a flash memory), an optical fiber, a portable compact disk read only memory (CD-ROM), an optical storage device, a magnetic storage device or any appropriate combination thereof.

The above description merely illustrates the preferred embodiments of the present disclosure and the technical principles employed. Those skilled in the art should understand that the scope of present disclosure is not limited to the technical solutions formed by certain combination of the above-mentioned technical features, and should also cover other technical solutions formed by any combination of the above-mentioned technical features and any equivalent features without departing from the disclosed concept. For example, a technical solution formed by replacing the features with the technical features disclosed in the present disclosure (but not limited to) with similar functions.

In addition, although the above operations are described in a specific order, it should not be understood that these operations are required to be performed in the specific order or performed in a sequential order. In some conditions, multitasking and parallel processing may be advantageous. Similarly, although multiple implementation details are included in the above descriptions, the details should not be interpreted as limitations to the scope of the present disclosure. Some features described in the context of an individual embodiment may also be implemented in combination in an individual embodiment. Otherwise, the features described in the context of an individual embodiment may be implemented individually or in any suitable sub-combination form in multiple embodiments.

Although the subject of the present disclosure has been described according to the structural features and/or logical actions of the method, it should be understood that the subject defined in the claims is not necessarily limited to the features or actions described above. Rather, the specific features and actions described above are only examples of the implementation of the claims.

The invention claimed is:

1. A method for adding animation to a video, comprising:
    detecting whether a hand of a user is displayed in a current video frame which is currently captured, and detecting whether an object is held in the hand of the user displayed in the current video frame;
    determining a target animation corresponding to the object, in response to the object being held; and
    determining an animation adding area corresponding to the target animation on the current video frame, and adding the target animation in the animation adding area,
    wherein the determining the target animation corresponding to the object comprises:
    extracting a preset image feature corresponding to the object being held in the hand of the user, wherein the preset image feature comprises at least one of a shape feature, a color feature, a size feature, and an object type of the object being held in the hand of the user in the current video frame; and
    determining the target animation corresponding to the preset image feature.

2. The method according to claim 1, wherein the preset image feature further comprises: at least one of a position feature of the object, and a gesture feature of the hand of the user holding the object.

3. The method according to claim 1, wherein the determining the animation adding area corresponding to the target animation on the current video frame comprises:
    determining an image area where the object is located, as the animation adding area.

4. The method according to claim 1, wherein the determining the animation adding area corresponding to the target animation on the current video frame comprises:
    determining an associated object of the object;
    detecting whether the current video frame comprises the associated object; and
    determining an area where the associated object is located as the animation adding area, in response to the current video frame comprising the associated object.

5. The method according to claim 1, wherein the determining the animation adding area corresponding to the target animation on the current video frame comprises:
    determining an object type of the object; and
    determining an entire image area of the current video frame as the animation adding area, in response to the object of a preset type.

6. The method according to claim 1, wherein before the adding the target animation in the animation adding area, the method further comprises:
    detecting whether a historical video frame with the object held in the hand of the user is comprised in a captured video frame before the current video frame;
    acquiring a historical animation adding area and a historical target animation of the historical video frame, in response to the historical video frame comprised in the captured video frame; and
    displaying the historical target animation in the historical animation adding area on the current video frame.

7. The method according to claim 1, further comprising:
    detecting whether the object is detached from the hand of the user, in a video frame captured after the current video frame;
    determining a motion track of the object after detached from the hand of the user on corresponding subsequent video frames, in response to the object detached from the hand of the user; and
    determining a track animation corresponding to the object, and adding the track animation based on the motion track.

8. The method according to claim 1, further comprising:
    determining sound data corresponding to the target animation; and
    playing the sound data while adding the target animation.

9. An electronic device, comprising:
    a processor; and
    a memory configured to store instructions executable by the processor, wherein the instructions, when executed by the processor, cause the processor to:
    detect whether a hand of a user is displayed in a current video frame which is currently captured, and detect whether an object is held in the hand of the user displayed in the current video frame;
    determine a target animation corresponding to the object, in response to the object being held; and
    determine an animation adding area corresponding to the target animation on the current video frame, and add the target animation in the animation adding area, wherein the instructions, when executed by the processor, cause the processor to:
    extract a preset image feature corresponding to the object being held in the hand of the user, wherein the preset image feature comprises at least one of a shape feature, a color feature, a size feature, and an object type of the object being held in the hand of the user in the current video frame; and determine the target animation corresponding to the preset image feature.

10. The electronic device according to claim 9, wherein the preset image feature further comprises: at least one of a position feature of the object, and a gesture feature of the hand of the user holding the object.

11. The electronic device according to claim 9, wherein the instructions, when executed by the processor, cause the processor to:

determine an image area where the object is located, as the animation adding area.

12. The electronic device according to claim 9, wherein the instructions, when executed by the processor, cause the processor to:

determine an associated object of the object;

detect whether the current video frame comprises the associated object; and determine an area where the associated object is located as the animation adding area, in response to the current video frame comprising the associated object.

13. The electronic device according to claim 9, wherein the instructions, when executed by the processor, cause the processor to:

determine an object type of the object; and determine an entire image area of the current video frame as the animation adding area, in response to the object of a preset type.

14. The electronic device according to claim 9, wherein the instructions, when executed by the processor, cause the processor to:

detect whether a historical video frame with the object held in the hand of the user is comprised in a captured video frame before the current video frame;

acquire a historical animation adding area and a historical target animation of the historical video frame, in response to the historical video frame comprised in the captured video frame; and display the historical target animation in the historical animation adding area on the current video frame.

15. The electronic device according to claim 9, wherein the instructions, when executed by the processor, cause the processor to:

detect whether the object is detached from the hand of the user, in a video frame captured after the current video frame;

determine a motion track of the object after detached from the hand of the user in corresponding subsequent video frames, in response to the object detached from the hand of the user; and determine a track animation corresponding to the object, and add the track animation based on the motion track.

16. The electronic device according to claim 9, wherein the instructions, when executed by the processor, cause the processor to:

determine sound data corresponding to the target animation; and play the sound data while adding the target animation.

17. A non-transitory computer readable storage medium storing a computer program thereon, wherein the computer program, when executed by a processor, causes the processor to:

detect whether a hand of a user is displayed in a current video frame which is currently captured, and detect whether an object is held in the hand of the user displayed in the current video frame;

determine a target animation corresponding to the object, in response to the object being held; and determine an animation adding area corresponding to the target animation on the current video frame, and add the target animation in the animation adding area, wherein the computer program, when executed by a processor, causes the processor to:

extract a preset image feature corresponding to the object being held in the hand of the user, wherein the preset image feature comprises at least one of a shape feature, a color feature, a size feature, and an object type of the object being held in the hand of the user in the current video frame; and determine the target animation corresponding to the preset image feature.

* * * * *